United States Patent
Brieskorn et al.

(10) Patent No.: US 6,965,915 B1
(45) Date of Patent: Nov. 15, 2005

(54) COMMUNICATIONS SYSTEM FOR THE CONTROL OF A COMMUNICATIONS TERMINAL BY A REMOTE COMPUTER

(75) Inventors: Jürgen Brieskorn, Geltendorf (DE); Markku Korpi, Stranberg (DE); Michael Sassin, San Jose, CA (US); Shmuel Shaffer, Palo Alto, CA (US)

(73) Assignee: Siemens Aktiengesellschaft, Munich (DE)

( * ) Notice: Subject to any disclaimer, the term of this patent is extended or adjusted under 35 U.S.C. 154(b) by 423 days.

(21) Appl. No.: 09/281,695

(22) Filed: Mar. 30, 1999

(51) Int. Cl.[7] ............................................. G06F 15/16
(52) U.S. Cl. ................ 709/204; 710/1; 370/201.11; 370/270; 370/352; 379/142.15
(58) Field of Search ...................... 709/204; 370/401, 370/270, 352, 201.11; 379/142.15; 710/1

(56) References Cited

U.S. PATENT DOCUMENTS

| | | | | |
|---|---|---|---|---|
| 5,442,761 A | * | 8/1995 | Toda et al. | 710/1 |
| 5,533,102 A | * | 7/1996 | Robinson et al. | 379/142.15 |
| 5,848,143 A | * | 12/1998 | Andrews et al. | 370/270 |
| 6,052,461 A | * | 4/2000 | Lam | 379/201.01 |
| 6,377,568 B1 | * | 4/2002 | Kelly | 370/352 |
| 2001/0043608 A1 | * | 11/2001 | Potter et al. | 370/401 |

* cited by examiner

*Primary Examiner*—Rupal Dharia
*Assistant Examiner*—Hai V. Nguyen
(74) *Attorney, Agent, or Firm*—Laurence A. Greenberg; Werner H. Stemer; Ralph E. Locher

(57) ABSTRACT

The communications system has a communications terminal that transmits status data to a remote computer. The remote computer processes a program that generates an instruction sequence on the basis of the status data. The instruction sequence is processed by a central controller of the communications terminal as a program section.

20 Claims, 1 Drawing Sheet

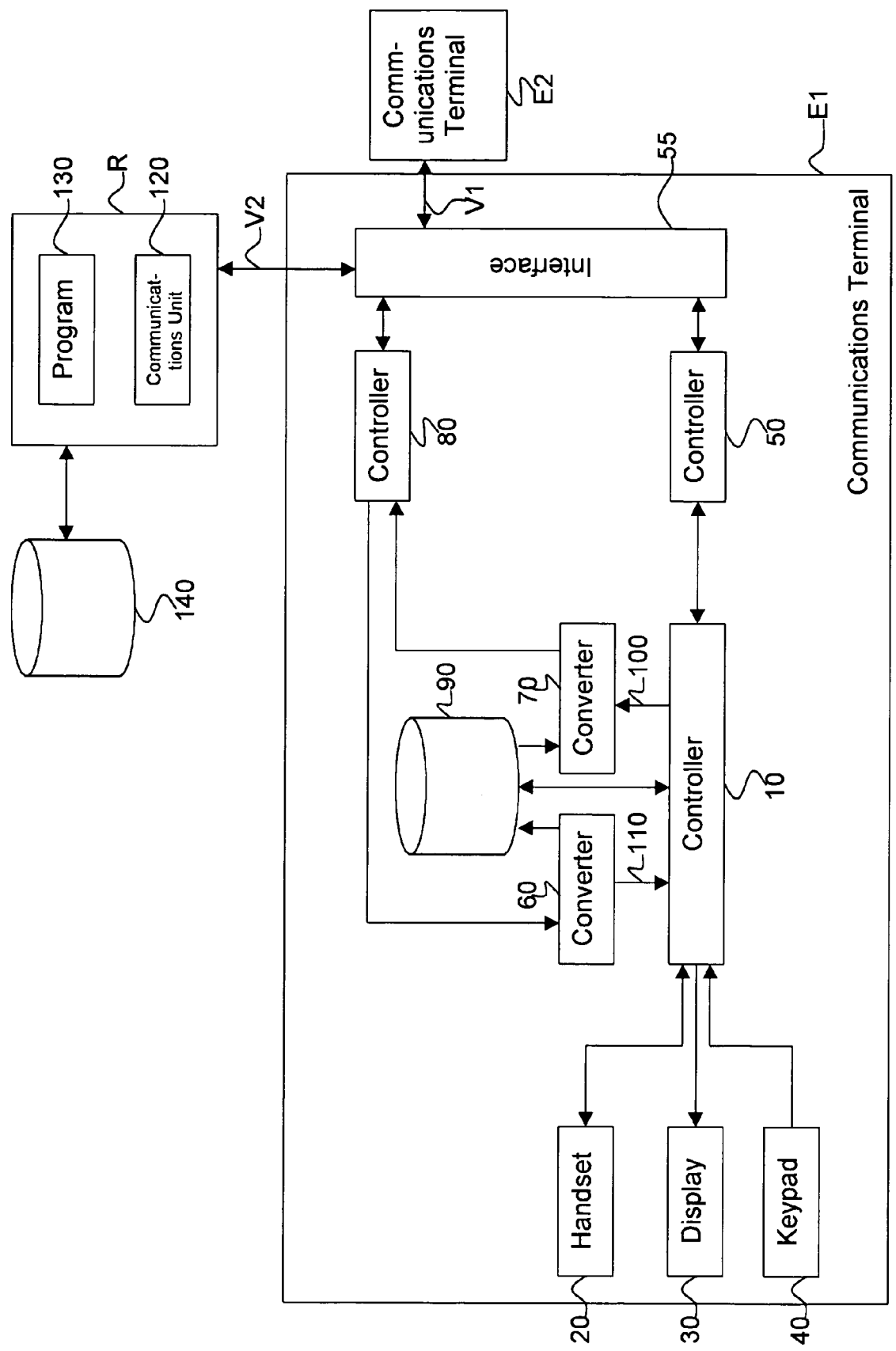

COMMUNICATIONS SYSTEM FOR THE CONTROL OF A COMMUNICATIONS TERMINAL BY A REMOTE COMPUTER

BACKGROUND OF THE INVENTION

Field of the Invention

The invention lies in the telecommunications field. Specifically, the invention relates to a communications system having a communications terminal which can be connected via a first network to at least one further communications terminal and which contains a central controller. The controller controls the function of the communications terminal by processing instructions of a program section.

Communications terminals are characterized by their features, that is to say they contain functions which the communications terminal makes available. Those features are defined by program sections which are processed by a microprocessor controller and which are stored, for example, in a memory chip of the communications terminal. Such features include, inter alia, establishing and clearing connections to other communications terminals, and redirecting incoming calls, for example. The addition of a further feature to already existing features requires replacing the memory chip containing the respective program parts for the features. To avoid the time-consuming replacement, which moreover requires specialist expertise, it is often necessary to replace the communications terminal with a new device. This entails acquisition costs for the new device. In addition, the user's personal data, such as telephone numbers from a telephone number directory stored in the memory of the communications terminal, are lost, since they are not usually transferred into the memory of the new device.

SUMMARY OF THE INVENTION

It is accordingly an object of the invention to provide a communications terminal, which overcomes the above-mentioned disadvantages of the heretofore-known devices and methods of this general type and in which the functional features are controlled and if necessary changed without intervention in the communications terminal being required.

With the foregoing and other objects in view there is provided, in accordance with the invention, a communications system, comprising:
  a first communications terminal to be connected, via a first network, to a further communications terminal;
  the first communications terminal having a controller transmitting status data about the first communications terminal to a remote computer via a second network, whereby the remote computer is programmed to generate an instruction sequence from the status data and to transmit the instruction sequence to the first communications terminal via the second network; and
  the controller controlling a function of the first communications terminal by processing the instruction sequence as a program section.

The invention is based on the preliminary concept that it is possible to influence the function of a communications terminal without having to make changes to the communications terminal if status data, for example a key input of a user of the communications terminal, are transmitted to a remote computer. The remote computer then evaluates the status data and determines an instruction sequence on the basis of the status data. The instruction sequence is transmitted back to the communications terminal and is employed by the controller of the communications terminal as the program section which, when processed, provides a feature.

Bit strings for designating features, for example call acceptance and call forwarding, are exchanged between the communications terminals. A communications protocol defines the features and the bit strings to be exchanged. Program sections which the communications terminal executes after receiving the bit string of the feature are stored in a memory of the communications terminal. The program section transmitted from the remote computer contains commands, for example to display the name of a calling subscriber on a visual display unit of the communications terminal. This program section is processed by a central controller of the communications terminal for example. The assignment of a new feature, which is selected by the remote computer as a result of the status data transmitted, to the program section to be transmitted to the communications terminal is known in the remote computer only. Changes to this program section are made in the remote computer; it is not necessary to replace a memory chip in the communications terminal or the communications terminal itself.

Data, for example a telephone number directory, are stored on an external storage medium of the remote computer. Consequently, these data continue to be available even after the communications terminal has been replaced because of a defect for example.

The duration of the connection between communications terminal and remote computer may be based on, for example, the duration of the connection between the communications terminal and the further communications terminal. A first embodiment provides for the connection to the remote computer to be established or cleared respectively each time the connection between the communications terminals is established or cleared. This embodiment is particularly suitable for communications terminals that are used very infrequently, for example once a day.

If the communications terminal is used very frequently at particular times of the day for example, a second embodiment provides for time-delayed clearing of a connection to the remote computer. This avoids loading the first network as a result of frequent connection establishment and clearing.

Finally, a third embodiment is conceived in which the duration of the connection between the remote computer and the communications terminal depends on the readiness to receive of the remote computer. This means that the connection is established between communications terminal and remote computer as soon as a program that evaluates the status data and determines the instruction sequence is started on the remote computer. The connection is cleared immediately before the program is terminated. This embodiment avoids a reaction time that lengthens the connection establishment.

With this third embodiment, it is favorable to store the address of the communications terminal in a memory of the remote computer because the remote computer now establishes and clears the connection to the communications terminal. This makes it possible to replace the remote computer without making changes to the communications terminal. For example, it avoids notifying the communications terminal of the address of the new remote computer.

In accordance with an added feature of the invention, the controller transmits the data via the first network in the defined Internet Protocol (IP). In other words, the transmission method which is defined by the known Internet Protocol is employed for data exchange between the communications terminals. The protocol specifies how the data to be exchanged between the communications terminals are divided up into data packets and defines a format for addresses of the communications terminals. Apart from voice and control data, use of this method also enables image data, for example, to be transmitted between the communications terminals.

In accordance with an additional feature of the invention, the second network transfers data in the Internet Protocol (IP) as well. It could be said, therefore, that the first and second network is the Internet. It is particularly favorable to employ the Internet Protocol also for exchanging data between the remote computer and the communications terminal. The protocol is used in particular for data exchange between computers in a computer network. Use of this protocol enables each computer in the computer network to establish and control a connection to the communications terminal. This assumes that the computer processes the program for evaluating the status data.

The above-mentioned further development also enables the connections to the remote computer and to the further communications terminal to be established via the known Internet, that is to say a computer network. This means that the same communication network is used for the connections between the communications terminals and for the connection to the remote computer. It is consequently unnecessary to set up a separate communication network. Moreover, connections via the Internet are less expensive than telephone connections.

In accordance with another feature of the invention, the first and further communications terminals communicate according to the definitions in the H.323 protocol. This enable voice and control data to be exchanged between communications terminals from different manufacturers. The H.323 protocol defines a data format and the control data to be transmitted between the communications terminals.

An example of such control data is a SETUP message. A calling communications terminal sends a bit string, for example "00000101", which is assigned to the SETUP message by the H.323 protocol, to a called communications terminal in order to establish a connection. Once it has received the bit string, the called communications terminal executes an instruction sequence which causes, for example, a bell character to sound and with which a bit string "00000001" is transmitted to the calling communications terminal. The bit string "00000001" corresponds to an ALERT message with which the called communications terminal notifies its connection establishment readiness to the calling communications terminal. The H.323 protocol defines which messages must be exchanged between the communications terminals. After receiving and evaluating the message, the communications terminal executes an instruction sequence assigned to said message. A protocol of this type is also referred to as a functional protocol. The advantage of functional protocols is the small amount of control data exchanged between the communications terminals. Functional protocols are used whenever the control instructions required to execute a feature are known to the communications terminal. The H.450 protocol is another functional protocol. It defines control data for features, for example call-back on busy, for communications terminals which control the connections to other communications terminals in accordance with the H.323 protocol.

In accordance with a further feature of the invention, a first communications controller controls communications with the further communications terminal. In a preferred embodiment, the remote computer and the first communications terminal communicate in accordance with a CSTA protocol.

In other words, it is advantageous if the control of the communication between the communications terminals is handled by a separate, first communications controller. This relieves the load on the central controller. The central controller can evaluate keypad inputs, for example, while the first communications controller is establishing a connection. In addition, this avoids any disturbance of the connection between the communications terminals interfering with the central controller.

It is especially favorable if the control of the communication to the remote computer is also handled by a separate, second communications controller. This avoids any disturbances of the connection with the remote computer, as a result of failure of the remote computer for example, affecting the communication between the communications terminals.

An advantageous further development of the invention envisages the use of a method defined by the CSTA protocol (CSTA= Computer Supported Telephone Application) for controlling the connection between the remote computer and the communications terminal. Said protocol supports the transmission of status data from the communications terminal to the remote computer and the transmission of control instructions from the remote computer to the communications terminal. Status data are, for example, information about incoming calls and a telephone number of a subscriber to be called which was dialed by a user of the communications terminal.

The control instructions transmitted are used, for example, to output a telephone number on a visual display unit of the communications terminal. The CSTA protocol is also referred to as a stimulating protocol. Stimulating protocols make it possible to offer new features to the user of the communications terminal by transmitting program sections required for the new features from the remote computer to the communications terminal. The program sections transmitted are processed by the central controller and the respective function is consequently executed. The program sections required are transmitted anew from the remote computer to the communications terminal each time prior to execution, so that storage of the program sections transmitted is unnecessary.

The CSTA protocol defines a set of CSTA instructions, which for the most part correspond to control instructions, but which have a syntax independent of the manufacturer of the particular communications terminal. One further development of the invention envisages that the instruction sequence determined by the computer contains solely CSTA instructions which are transmitted to the communications terminal. As a consequence, it is unnecessary to adapt a program of the remote computer which is responsible for determining the instruction sequences to communications terminals of different manufacturers.

The conversion of CSTA instructions into control instructions of the communications terminal can be handled, for example, by the central controller. The use of a separate, second converter to relieve the load on the central controller is advantageous.

In an advantageous further development, the central controller reads key codes of keys the user has pressed from a keypad buffer. This further development allows the user to correct the dialed key sequence before connection establishment commences.

One further development of the invention furthermore envisages that the status data contain the key codes of keys pressed. This allows, for example, the telephone number of a subscriber to be called to be transmitted to the remote computer. A control program processed by the remote computer checks before connection establishment whether the telephone number is barred. This further development additionally enables key inputs of the user to be employed also for selecting menu entries displayed on a visual display unit.

Another embodiment envisages that a data item identifying the communications terminal is transmitted with the status data. This embodiment allows the remote computer to establish connections to a plurality of communications terminals. A code number defined by the remote computer upon establishment of the connection between remote computer and communications terminal may be employed as an identifying data item for example.

Other features which are considered as characteristic for the invention are set forth in the appended claims.

Although the invention is illustrated and described herein as embodied in communications system for the control of a communications terminal by a remote computer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWINGS

The sole FIGURE is a schematic diagram of the structure of a communications system having two communications terminals and one computer.

DESCRIPTION OF THE PREFERRED EMBODIMENTS

Referring now to the sole FIGURE of the drawing in detail, there is seen a communications system having a communications terminal E1 which is connected to a computer R and to a further communications terminal E2. The structure of the communications terminal E1 will now be explained. A handset 20, a visual display unit 30 and a keypad 40 form a user interface of the communications terminal E1. A first communications controller 50 controls the data exchange with the second communications terminal E2. A first and second converter 60 and 70 and a second communications controller 80 are responsible for data exchange with the computer R. A central controller 10 controls the functions of the communications terminal E1, for example the evaluation of key inputs of a user of the communications terminal E1.

The voice data of the user which are recorded by a non-illustrated microphone of the handset 20 and digitized by an A/D converter (analog-to-digital converter) are accepted by the central controller 10 and forwarded to the first communications controller 50. From the voice data, the first communications controller 50 forms data packets in accordance with an H.323 protocol. The H.323 protocol defines a method for exchanging voice data between the communications terminals E1 and E2 which are connected to one another via an Internet connection V1. Via a line interface 55, the first communications terminal E1 has access to a computer network, not shown here, over which the Internet connection V1 is established. The first communications controller 50 prepares received data packets containing digitized voice data accordingly, and passes them to the central controller 10, which forwards the packets to a non-illustrated D/A converter (digital-to-analog converter) of the handset 20. The analog voice signals generated by the D/A converter are output by a loudspeaker of the handset 20.

The central controller 10 likewise evaluates user inputs that affect the behavior of the first communications terminal E1, for example the lifting of the handset 20. If, for example, the user lifts the handset 20, the voltage level of a control line connecting the handset 20 to the central controller 10 changes. The central controller 10 registers this changed voltage level and writes a first value "1" into a memory cell Z1 of a memory 90 of the communications terminal E1. This first value "1" indicates that the handset 20 was lifted. A second value "0" in the memory cell Z1 indicates that the handset 20 is on-hook. The contents of further memory cells of the memory 90 indicate statuses of further functional units of the communications terminal E1, for example of the keypad.

The first converter 70 knows the assignment of memory cells to functional units of the communications terminal E1. If the central controller 10 has changed the contents of a memory cell, it sends the address of the changed memory cell to the first converter 70 over a first address line 100. The first converter 70 reads the first value "1", for example, from the memory cell Z1 and from it forms a CSTA data packet (CSTA= Computer Supported Telephone Application) with the information about the lifted handset 20. The CSTA data packet is passed to the second communications controller 80, which transmits it to a communication unit 120 of the computer R over a LAN connection V2 (LAN=Local Area Network).

A program 130, which the computer R processes, evaluates the received data packet. In this example the following feature is made available to the user with the aid of the program 130: as soon as the user lifts the handset 20 to dial a telephone number, the telephone number most frequently dialed by the user is displayed on the visual display unit 30. If the user presses a redial key of the keypad 40, a connection is established to the subscriber having the displayed telephone number.

After evaluating the received CSTA data packet, the program 130 uses a list L of dialed telephone numbers to determine a digit string of the most frequently dialed telephone number. The list L is stored in a memory 140 of the computer R. The most frequently dialed telephone number is determined with reference to the list L.

The program 130 composes a CSTA message INFO with which data to be output on the visual display unit are sent to the communications terminal E1. The communication unit 120 accepts the CSTA message INFO from the program 130 and forms a further CSTA data packet and sends the latter to the communications terminal E1 over the LAN connection V2.

The second communications controller 80 receives the CSTA data packet and passes the CSTA message INFO it contains to the second converter 60. While the second converter 60 creates an instruction for outputting the digit string on the visual display unit 30 from the CSTA message INFO, the second communications controller 80 is again available for sending and receiving CSTA data packets. The second converter 60 writes the instruction created into a memory section A of the memory 90 and notifies the central controller 10 of the address of said memory section A via a second address line 110. The central controller 10 reads the instruction and executes it, so that the digit string is displayed on the visual display unit 30.

The central controller 10 transmits the key code of the key the user presses next to the computer R. If the key code transmitted is the key code of the redial key, the program 130 composes a sequence of CSTA instructions which write the digit string of the most frequently dialed telephone number into a non-illustrated keypad buffer of the communications terminal E1.

With the CSTA instructions, the communication unit 120 forms CSTA data packets and transmits the CSTA data packets to the second communications controller 80. The second converter 60 converts the CSTA commands into control instructions, which are executed by the central controller 10 and which write the key codes corresponding to the digit string into the keypad buffer. The central controller 10 then reads the key codes out of the keypad buffer and passes them to the first communications controller 50. The latter establishes the Internet connection V1 to the communications terminal E2 to which the most frequently dialed telephone number is assigned.

If the user had pressed a numerical key of the keypad 40 instead of the redial key, the program 130 would have created a different instruction sequence: firstly all characters displayed on the visual display unit 30 would have been removed. The digit dialed by the user would then be displayed and passed to the first communications controller 50.

It can be seen that the central controller 10 and the first communications controller 50 have not been changed in order to realize the feature described above. Communication between the two communications terminals E1 and E2 takes place in accordance with the method defined by the H.323 protocol. The digit string is also transmitted to the computer R in order to update the list L with the dialed telephone numbers.

In the exemplary embodiment, the program 130 evaluates the keypad inputs, selects the corresponding telephone number from the list L and transmits an instruction sequence to display the telephone number on the visual display unit to the communications terminal E1. The procedure described has the advantage that after the communications terminal E1 has been replaced by another device, for example because of a defect in the communications terminal E1, the same telephone number is displayed to the user on the visual display unit 30. The example shows how resources of the computer R, here the memory 140, are used to make a new feature available to the user of the communications terminal E1. It should moreover be noted that the functions for which program sections are stored in a read-only memory (ROM) of the communications terminal E1 are available even if the computer R fails or the LAN connection V2 is not present.

We claim:

1. A communications system, comprising:
    a first communications terminal to be connected, via a first network, to a second communications terminal;
    a remote computer;
    said first communications terminal having a central controller transmitting status data relating to functional features of said first communications terminal to a said remote computer via a second network, said remote computer being programmed to automatically evaluate the status data and to generate an instruction sequence from the status data and to transmit the instruction sequence to said first communications terminal via the second network; and
    said central controller employing the instruction sequence as a program section and providing the functional features to said first communications terminal upon processing the program section.

2. The communications system according to claim 1, wherein said controller transmits the data via the first network in accordance with an Internet Protocol.

3. The communications system according to claim 2, wherein the second network transfers data in the Internet Protocol.

4. The communications system according to claim 3, wherein the first and second network is the Internet.

5. The communications system according to claim 2, wherein said first and second communications terminals communicate according to a H.323 protocol.

6. The communications system according to claim 5, which further comprises a first communications controller controlling a communication with said second communications terminal.

7. The communications system according to claim 6, wherein said remote computer and said first communications terminal communicate in accordance with a CSTA protocol.

8. The communications system according to claim 6, which further comprises a second communications controller controlling a communication between said first communications terminal and said remote computer.

9. The communications system according to claim 8, which further comprises a shared interface connected to said first and second communications controllers and connecting said first and second communications controllers to the Internet.

10. The communications system according to claim 8, which further comprises a first converter connected to receive the status data from said central controller, said first converter adapting the status data to a data format defined by the CSTA protocol and forwarding the status data to said second communications controller.

11. The communications system according to claim 1, wherein the instruction sequence generated by the remote computer contains instructions defined by the CSTA protocol.

12. The communications system according to claim 11, which further comprises a converter connected between the remote computer and said central controller, said converter converting CSTA instructions transmitted from the remote computer into control instructions for said central controller.

13. The communications system according to claim 1, wherein said central controller is configured for reading keyboard codes of keys pressed from a keypad buffer.

14. The communications system according to claim 13, wherein the status data contain key codes of keys pressed.

15. The communications system according to claim 13, wherein said controller is programmed to generate from the status data instructions writing key codes into the keypad buffer.

16. The communications system according to claim 1, wherein said first communications terminal includes a visual display unit, and said remote computer is programmed to generate from the status data instructions which output data on said visual display unit.

17. The communications system according to claim 1, wherein said remote computer is programmed to generate from the status data instructions for producing sound signals.

18. The communications system according to claim 1, wherein the status data contain a telephone number of said second communications terminal calling said first communications terminal.

19. The communications system according to claim 1, wherein the remote computer is programmed to establish a connection to said first communications terminal.

20. The communications system according to claim 19, wherein a data item identifying said first communications terminal is transmitted with the status data.

* * * * *